United States Patent
Mikkola et al.

(10) Patent No.: US 6,529,143 B2
(45) Date of Patent: *Mar. 4, 2003

(54) INFORMATION RETRIEVAL SYSTEM

(75) Inventors: Markus Mikkola, Tampere (FI); Jarkko Lempiö, Tampere (FI); Virpi Säntti, Tampere (FI)

(73) Assignee: Nokia Mobile Phones Ltd., Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/422,509

(22) Filed: Oct. 21, 1999

(65) Prior Publication Data

US 2002/0047787 A1 Apr. 25, 2002

(30) Foreign Application Priority Data

Oct. 23, 1998 (FI) .................................................. 982305

(51) Int. Cl.7 ............................................... G08G 1/123
(52) U.S. Cl. ........................ 340/995; 340/988; 342/457; 701/211
(58) Field of Search ................................ 340/905, 995, 340/988; 701/213, 211; 342/457; 455/456

(56) References Cited

U.S. PATENT DOCUMENTS

| | | | | |
|---|---|---|---|---|
| 5,543,789 A | * | 8/1996 | Behr et al. | 340/995 |
| 5,579,535 A | * | 11/1996 | Orlen et al. | 340/995 |
| 5,608,635 A | * | 3/1997 | Tamai | 340/990 |
| 5,627,549 A | | 5/1997 | Park | 342/357 |
| 5,648,768 A | * | 7/1997 | Bouve | 340/905 |
| 6,014,090 A | * | 1/2000 | Rosen et al. | 340/905 |
| 6,111,521 A | * | 8/2000 | Mulder et al. | 340/905 |

FOREIGN PATENT DOCUMENTS

| | | |
|---|---|---|
| DE | 4322288 A1 | 1/1995 |
| DE | 4445582 C1 | 3/1996 |
| EP | 0703463 A3 | 3/1996 |
| EP | 0785535 A1 | 7/1997 |
| EP | 0869688 A2 | 10/1998 |
| EP | 0874344 A2 | 10/1998 |
| WO | WO 96/11436 | 4/1996 |
| WO | WO 98/15075 | 4/1998 |

OTHER PUBLICATIONS

European Patent Application No. EP 412286 with English translation of the Abstract, 10–88.
Swedish Patent Application No. SE 9801266–9, English translation of the Abstract, 10–99.
Swedish Patent Application No. SE 9801267–7, English translation of the Abstract, 10–99.

* cited by examiner

*Primary Examiner*—Brent A. Swarthout
(74) *Attorney, Agent, or Firm*—Perman & Green, LLP (57) ABSTRACT

A method and devices for a mobile person's information retrieval where, when the person is moving, on coming closer to a point of destination, defined by him as being interesting, than a specified threshold separation, he will be informed of such a point of interest and, on request, additional data will be presented on it, such as driving instructions or a map.

The person is also offered a button with which he can make a call to the phone number of the point of interest presented each time. The person can add by himself new points of interest and select from available points of interest individual or several points of interest on the basis of their class, such as, e.g. restaurants or service stations.

21 Claims, 9 Drawing Sheets

INFORMATION RETRIEVAL SYSTEM

FIELD OF THE INVENTION

The present invention relates to an information retrieval system to be installed in a vehicle, more precisely, to a system for transmitting data according to personally made selections to a user of the system when he arrives in the vicinity of a point of interest.

BACKGROUND OF THE INVENTION

To facilitate navigating by a car to unfamiliar places, different types of navigation systems have been developed wherein, e.g. the Global Positioning System (GPS) has been used. By means of them, the user can determine his position and acquire useful information, e.g. on airports.

By combining a positioning system, e.g. with other information distributed through a digital radio network, it is possible to build systems that benefit those moving by car more comprehensively than ever, as has been described in patent application publication EP 785 535. There a user is supplied with traffic and city information, on a radio path, onto the display of his mobile communication device. Although it is possible to supply information from several different sources to the user, the information is always provided in a consistent manner according to the type of the information with buttons with which he can select, e.g. a map or other information for being displayed. However, the data are supplied for being displayed to the user at the initiative of the user, i.e. the user himself always initiates the process as a result of which information that is of interest to him will be presented. Thus, he does not get all the information he would like or, alternatively, the user himself has to search for the information that is of interest to him without knowing when such information possibly becomes available to him.

U.S. Pat. No. 5,627,549 presents a system by means of which advertising data on different kinds of points of interest are transmitted in connection with a radio transmission to a terminal installed in a moving vehicle. The data comprise the exact geographical position of the points of interest, as well as detailed advertising information provided by the advertising company. The terminal determines its own position by means of a GPS device and calculates its distance from each point of interest. The terminal can also filter the data into a specific type according to the user's preferences. However, in the system, all the data therein are transmitted on a radio path as a continuous or repeated data flow even if no terminal was using them. In this way, the system wastes radio path capacity. As a result of this, the number of advertisements transmitted by the system is also limited because the data transfer rate on a radio path is normally quite low and it should be possible to send all the advertisements of the system one after another frequently enough so that the terminal utilising the system gets the required information on time. A positioning device installed in every vehicle also increases the costs of the system, especially the price of terminals.

The requirements set by safety and ergonomics should also be taken into consideration in all information retrieval and communication devices which are to be installed in a vehicle. Thus, vehicle devices should be as simple and easy to use as possible and the amount of interaction from the driver needed to use them should be minimised. Especially when a terminal installed in a vehicle places a large amount of information at the user's disposal it is appropriate to arrange a consistent and easy way to control the most frequently used functions.

SUMMARY OF THE INVENTION

Now, a method and devices have been invented by means of which a mobile user can automatically be informed of geographical points of interest (POI) that are of interest to him, when specific threshold values are met and where the meeting of these values is monitored in a stationary ground station or stations. A user-specific terminal according to the invention comprises functionality of a mobile station by means of which the terminal can also be used with a mobile communication network for determining its position. Stations maintaining POI data are preferably fixed, located in a specific place but, alternatively, they can be placed, e.g. in a vehicle and connected to a mobile communication network using high-speed radio connection. According to the invention, data are collected on POIs in one or more databases, which are maintained in one or more ground stations. In addition, the mobility of the user is monitored if necessary in one or more ground stations and when the user arrives in the vicinity of any of the POIs, data on the POI in question are automatically transmitted wirelessly to his terminal, whereupon POI data are only transmitted when necessary. Of said stations, one or more can be in connection with one another or they can be integrated, and the stations can also be mobile although they preferably are fixed ground stations. In addition, the user can select his points of interest individually or in groups, he can select, e.g. service stations and local arts-and-crafts museums as his general points of interest. The user can preferably also himself set specific separation or travel time values on the POIs he has selected. When he is approaching a destination, which he has defined as being of interest to him and comes closer to it than a determined threshold separation, he will automatically receive an audiophonic and/or visual message. The message may contain, e.g. driving instructions, information on prices and opening hours, and other such information that has been input into the system by, e.g. the point of interest in question. A database of its own comprising POI data is preferably also arranged for the user terminal, which database the user can utilise without having to retrieve information wirelessly. Said own database can preferably be arranged to be updated using wirelessly received POI data, whereupon the need for wireless data transfer can be further decreased by the database. The user can also be offered in the destination's contact information among POI data, whereupon the user can establish, if he so desires, a data transfer connection to the point of interest, in a consistent way independent of the point of interest, by using a mobile station that belongs to the system. The information intended for the user can also be real-time, whereupon relevant traffic reports can also be transmitted by the system.

It is characteristic of a method according to a first aspect of the invention for informing a mobile person of a geographical point of interest that is of interest to him by means of an information retrieval device, that it comprises allowing said person to define with said information retrieval device at least one point of interest he desires and a threshold separation, the threshold separation being at least one of the following variables: distance and time, repeatedly monitoring the position of said information retrieval device, collecting available information on all such destinations as said person has defined with said information retrieval device as his desired points of interest and which are within said threshold separation from the location of said information retrieval device, sending information on such destination to said information retrieval device, and informing said person with said information retrieval device of this kind of destination.

It is characteristic of a method according to a second aspect of the invention for informing a mobile person of a geographical point of interest that is of interest to him with an information retrieval device, that is comprises allowing said person to define with said information retrieval device at least one point of interest he desires and a threshold separation, the threshold separation being at least one of the following variables: distance and time, repeatedly monitoring the position of said information retrieval device, collecting available information on all such destinations as said person has defined with said information retrieval device as his desired points of interest and which are within said threshold separation from the location of said information retrieval device, sending to said information retrieval device its position with a specific accuracy, searching said collected data with said information retrieval device for such points of interest as are within said threshold separation from the position of said information retrieval device at the time in question, and informing said person of this kind of destination.

It is characteristic of an information retrieval device according to the invention comprising positioning means for maintaining the position data of said information retrieval device, that said information retrieval device comprises:

input means for receiving the selection of at least one point of interest that is of interest to the user and at least one criterion of separation from the user of said information retrieval device, the criterion of separation being one of the following variables: distance and time, a radio receiver for receiving data on at least one point of interest that meets a specific criterion of separation, a memory for storing the received data, and output means for presenting said data.

It is characteristic of a server according to the invention, comprising processing means, for the use of the server being arranged a first database comprising a set of records each having at least one field, and the server comprising data transfer means by means of which it is arranged to be connected to at least one base station of a mobile communication network for transferring at least one record field to at least one information retrieval device, that said records comprise data on destinations which are specific geographical POIs, said data transfer means are arranged to receive the position of said information retrieval device, said processing means are arranged to screen from said database relevant records that meet specific criteria, said data transfer means are arranged to transmit from at least one of said relevant records at least one field to said information retrieval device, and that of said criteria, at least one is a criterion of separation relating to the separation between said information retrieval device and a geographical POI, the criterion of separation being one of the following variables: distance and time.

It is characteristic of an information retrieval system according to the invention that it comprises a mobile communication network, an information retrieval device and a server to be connected thereto, as well as a first database comprising a set of records which comprise data on points of interest, the points of interest being specific geographical POIs and each record having at least one field, and one of the fields being the position of said destination, positioning means for determining the position data of said information retrieval device, first data transfer means for sending the position data of said information retrieval device to said server, that said server comprises:
screening means for screening from said database relevant records that meet specific criteria,
said data transfer means being arranged to send from at least one of said relevant records at least one field to said information retrieval device, and that said information retrieval device comprises:
a radio receiver for receiving data on at least one POI,
a memory for storing the received data, as well as
output means for presenting said data.

In a navigation and communication system according to a first aspect of the invention, a terminal comprises means for searching available POI data for destinations that are of interest to the user and in the vicinity of the user. The position of the user terminal and the user selected POIs or their classes, as well as the common or individual criteria of separation selected for them are transmitted, e.g. through a mobile communication network to a POI server maintaining a POI database produced from POI data. The POI database has data on different POIs, such as the name, the phone number of each destination, possibly some criteria of the advertiser, such as the period of validity which, in case the POI is a firm, may correspond to the opening hours of the firm in question, and preferably also an index to speed up the information retrieval. The database may also contain one or several of the following POI data: POI class, electronic map, WEB address, e-mail address, street address and the geographical co-ordinates of the POI. The POI server retrieves from the POI database the data on the destinations in the vicinity of the user which are of interest to the user and, of these relevant POI data, transmits to the terminal at least their names, preferably also the indexes and the criteria of the advertiser. Alternatively, the terminal only sends the POI server a request to get POI data, and the server transmits to the terminal all POI data or merely those selected on the basis of the user's position or the points that are of interest to the user. In this case, the operation of the POI server becomes substantially easier although the need for data transfer probably increases. When the POI server selects POI data on the basis of the user's position, it is possible to send, of the POI data, e.g. a database established for a single area, in its entirety, whereupon the regional division can preferably conform to, e.g. the operating area of the base station controllers of the mobile communication network used other corresponding regional division.

However, the POI server may transmit to the terminal one or more POI records completely or partly. From these data, provided by the POI server, the terminal searches for destinations in the vicinity of its user which destinations the user has defined as being of interest to him, and when such a destination is found, the user can select one or more to be presented, whereupon the terminal presents more detailed information on the POI or POIs. Alternatively, if the POI server has only transferred to the terminal part of the POI data, the terminal can ask, e.g. through the mobile communication network, the POI server for additional data on the POI or POIs selected by the user. In this case, the POI server retrieves the requested additional data and, on finding them, sends them to the terminal, which then presents them to the user.

The terminal may also comprise a POI database of its own, e.g. on a CD-ROM disk, and it may have, in its scratch pad memory, POI data that it has already earlier received wirelessly from the POI server. In this case, it preferably searches the last received POI data and the POI data in its memory and/or mass storage for those data that meet all the criteria set, and informs the user of them.

In an information retrieval system according to a second aspect of the invention, a POI server is provided with the position of a terminal and the POI settings of a user. The POI server searches for the relevant POI data, i.e. POI data that meet the criteria of both the user and the advertiser, and transfers them on a radio part to the user terminal, which receives the data and informs the user of them. The user can then select one or several of these for being presented, whereupon the terminal presents more detailed information on the POI or POIs selected by the user. Thus, the terminal does not search for POI data according to user-specific criteria.

In a navigation and communication system according to a third aspect of the invention, POI data are transmitted continuously or at short intervals on a radio path by means of a radio transmitter. A terminal which in within the range of coverage of the radio transmitter retrieves from these data the POI data on the POIs in the vicinity of the user that are of interest to the user and informs the user of the availability of such data. The user can then select one or several of these for being presented and get more detailed information on the POI or POIs. In this form, the POI server does not search for POI data according to criteria.

In a navigation and communication system according to the invention, the position of a terminal is preferably determined by positioning the terminal connected to a mobile communication network, which is done by bearing by means of base stations. In future cellular networks, the cell size will be decreased to increase the capacity of a mobile communication network, and base stations will be capable of determining the position of a terminal in their coverage area, connected to the network, i.e. typically, a terminal which is on, more and more accurately, even with an accuracy of 150 meters. In addition, e.g. a densified radio receiver network bearing mobile station transmission can be used with the receivers of base stations of the actual mobile communication network for focusing the bearing.

BRIEF DESCRIPTION OF THE DRAWINGS

In the following, the present invention will be discussed in detail by referring to the enclosed drawings, in which.

DETAILED DESCRIPTION

Figure 1:
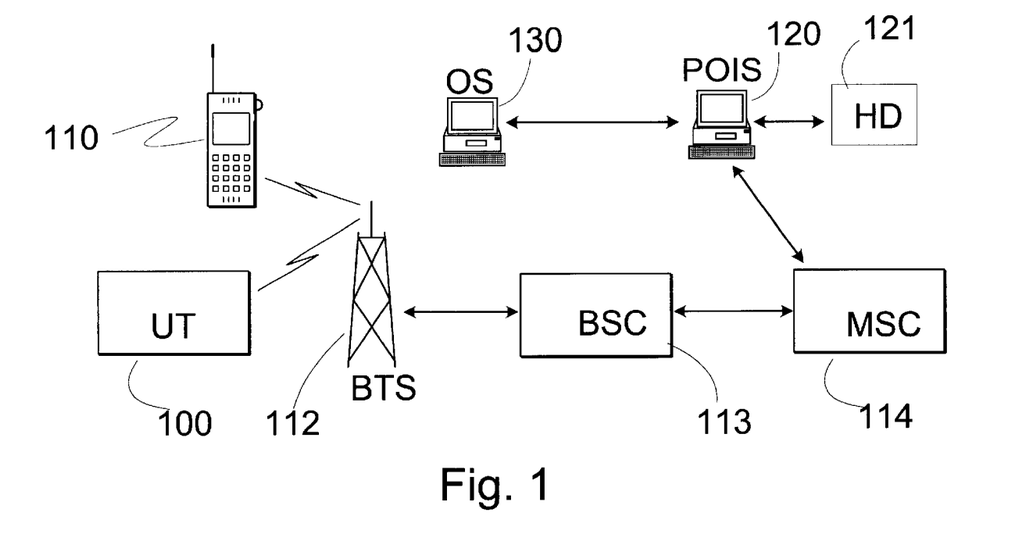
FIG. 1 is a block diagram of an information retrieval system according to a first aspect of the invention, showing the parts essential as regards the invention.

FIG. 1 shows the parts of an information retrieval system according to a first aspect of the invention. The system comprises a mobile communication network whereto a user terminal 100 and a POI data server 120 are connected. The POI data are preferably but not necessarily input in an operating station 130 in a mass storage 121 of the server 120. The operating station can connect to the server directly or, for example, by a modem through an optional telephone network or, e.g. through the Internet. There can be several operating stations like this and preferably more than one can simultaneously connect to the server for maintaining the data of a database stored in the server's mass storage. Alternatively, the POI data can be input into the database from the server itself. The server's mass storage is preferably a high-speed SCSI (Small Computer Systems Interface) hard disk. It is also possible to input POI data into the database from the server itself. The server connects to the mobile communication network through a mobile services switching centre (MSC) 114. The MSC 114 is in communication with at least one base station controller 113 which, in turn, controls at least one base station 112. The user making use of the system can connect with his own terminal 100 to the mobile communication network through the base station 112 at the same as another mobile communication network subscriber can connect with his mobile phone 110 to the mobile communication network. Thus, the terminal 100 and the server 120 are in communication with each other through the mobile communication network. The server 120 can also connect to the mobile communication network through other data transfer connections or networks, such as the Internet.

Figure 2:
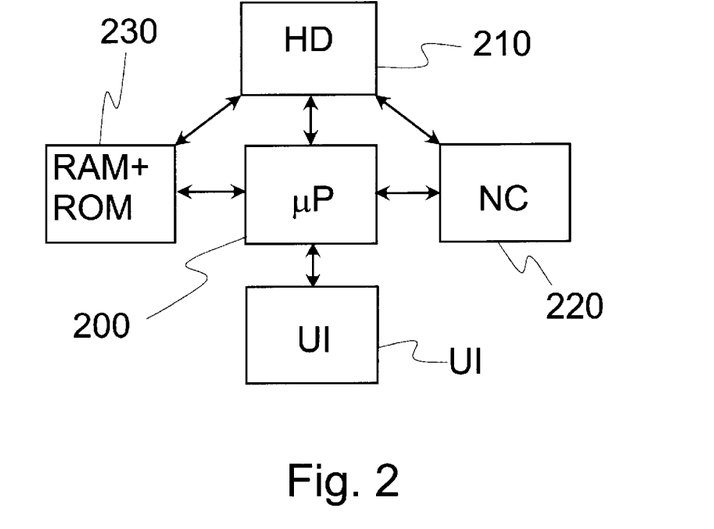
FIG. 2 is a block diagram of a POI server of FIG. 1 connected to a mobile communication network, showing the parts essential as regards the invention.

FIG. 2 shows the parts of the POI data server 120 according to FIG. 1, essential for the understanding of the invention. The server has a microprocessor 200, whereto are connected a hard disk 210, a network adapter 220, a memory 230 comprising a non-volatile memory ROM (Read only memory) and a read-alter memory RAM (Random Access Memory) and, preferably but not necessarily, a user interface UI. Data transfer between the hard disk 210 and the memory 230, and between the hard disk 210 and the network adapter 220 can preferably take place directly at least occasionally without the information having to go through the microprocessor. Alternatively, in the place of or in addition to the network adapter, the server may comprise one or more modems.

Figure 3:
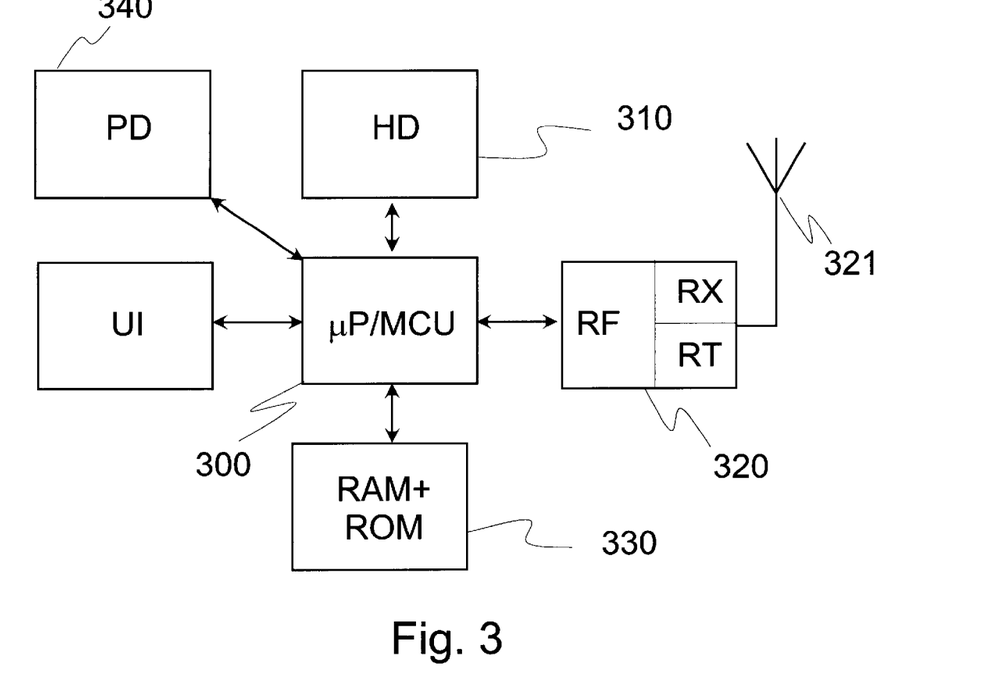
FIG. 3 is a block diagram of a user terminal of FIG. 1, showing the parts essential as regards the invention.

FIG. 3 shows the most important parts of a terminal according to FIG. 1. The terminal comprises a processor 300, which is preferably a microprocessor or a MCU (Master Control Unit). The processor controls the operation of the terminal's other parts, which are a mass storage 310, a radio part 320 comprising a radio transmitter and receiver, a memory 330, a user interface UI, and positioning means 340. The mass storage 310 preferably comprises a CD-ROM or a DVD (Digital Video Disk) drive for storing large amounts of data. The radio part 320 can transmit and receive messages at a radio frequency by means of its antenna 321. The memory 330 comprises a non-volatile memory ROM from where information will not disappear even if the terminal did not get any supply voltage from the car. In this memory, there can be, e.g. a program controlling the operation of the terminal. The memory also comprises a read-alter storage RAM, which the processor uses in data processing as a temporary buffer. The user interface UI comprises means by means of which the user can use the device. The positioning means can be the terminal's own or external and they can be arranged to be connected for the use of the terminal.

Figure 4:
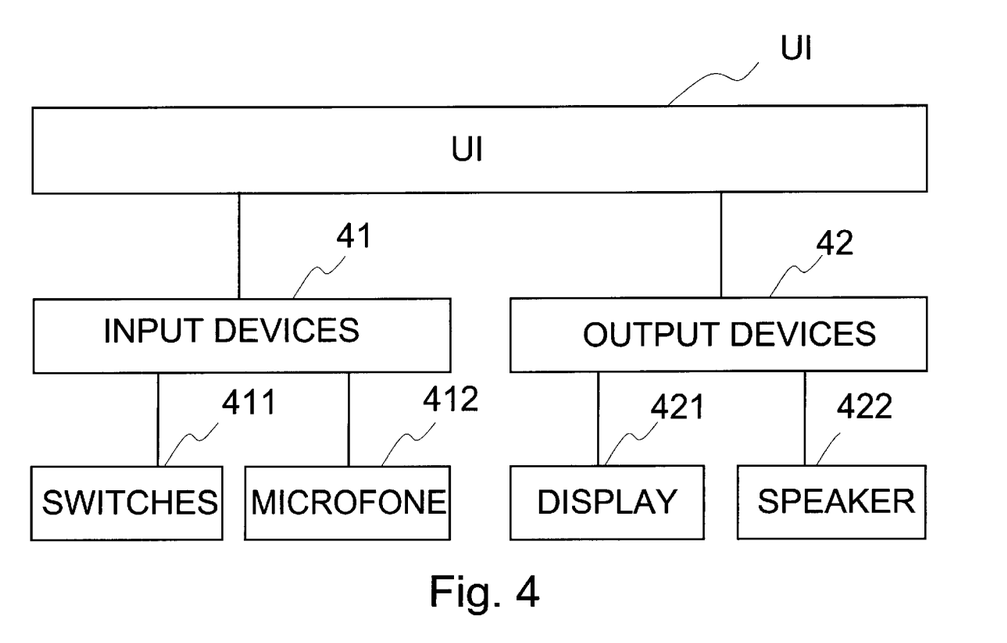
FIG. 4 is a block diagram of a user interface of FIG. 3, showing the parts essential as regards the invention.

FIG. 4 shows parts of the user interface UI. The user interface comprises input means 41 for receiving an input given by the user, as well as output means 42 for presenting the information to the user. The input means 41 comprise, e.g. operating switches 411 of the device, such as a current switch, keys, a touch screen, a microphone 412, and possibly a speech recognition system for interpreting spoken input. The output means 42 comprise, e.g. a display 421 and a speaker 422, and possibly also speech synthesising devices for presenting as spoken data transferred as, e.g. text or phonemes.

Figure 5A:
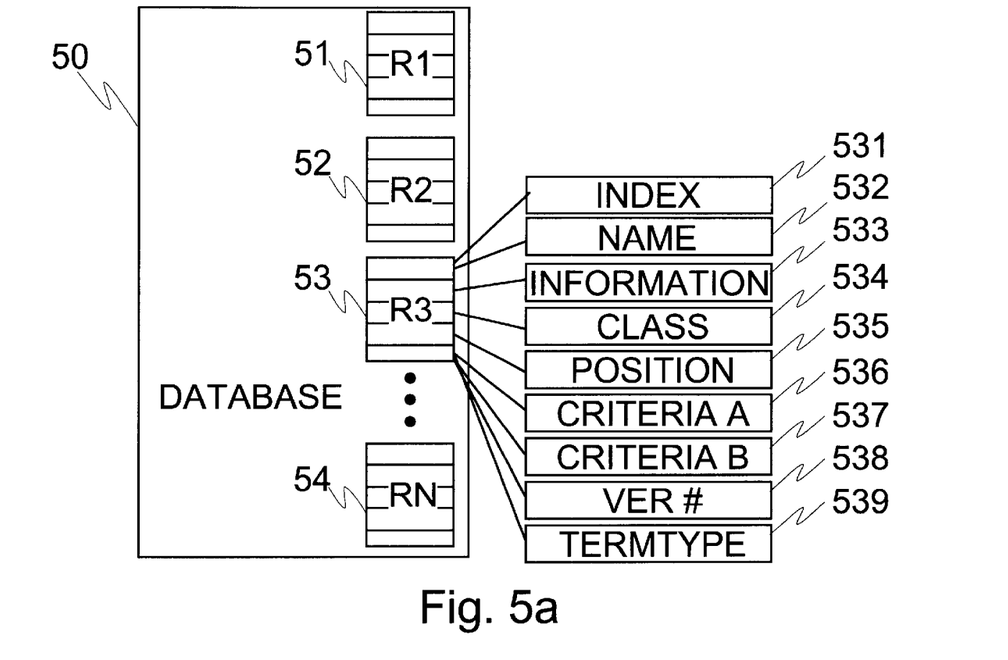
FIG. 5a is a block diagram of the structure of an exemplary POI database.

FIG. 5a shows an exemplary structure of a POI database 50. The POI database can be structured comprising a set of records 51 each having a set of fields of a specific shape. These fields include:
531. An index for speeding up the retrieval,
532. The name of a POI,
533. The POI data which include, e.g. the name of a POI, the description of the service offered by it, contact information, i.e. the address, the fax and phone number (s), and possibly also Internet addresses (e-mail, WWW homepages),
534. A class for grouping these data according to their contents, e.g. into a class Motoring-Service Stations, Entertainment-Movies-Cinemas or Healthcare-Pharmacies-Open,
535. The position of the destination referred to by POI data,
536. A first criterion of validity used to determine the point of time at which informing of the destination referred to by POI data is meaningful.
537. A second criterion of validity used to determine the direction or directions in which the user of the system should be moving so that informing of the destination referred to by the POI data would be meaningful,
538. A field for the version number and/or update of a record, and
539. A terminal type for indicating the suitability of POI data for different terminals.

An example of the first criterion of validity could be the opening hours of a service station or a pharmacy or perhaps a sufficiently high water temperature of a beach, e.g. over 18 degrees. The criterion of validity should be based on a variable that can be automatically determined and sent for the use of all the terminals in the area.

The direction intended by the second criterion of validity can be either the cardinal point of the compass to which the terminal is moving or the direction of a vector, imagined from the terminal to the destination referred to by the POI data, with respect to the four cardinal points of the compass. For example, to a service station situated only on one side of a motorway, it is not worth advertising to those driving on the other side of the motorway if there is an access to the service station only on one side of the motorway. In this case, the point of the compass to which a terminal is moving reveals to the system whether it is worth informing the user of the service station at all. The point of the compass can also be easily determined. By using a relative course, i.e. the direction to a destination with respect to the cardinal points of the compass, it is also possible to arrange at the same time the changing of the POI data into irrelevant immediately when the user has passed the service station. However, the determination of relative course must always be calculated separately for each destination referred to by the POI data after the terminal has moved.

A database can also be implemented in a way other than completely structured, but since it probably becomes quite large it should, however, be designed carefully to guarantee sufficiently fast operation.

A terminal type field 539 enables the processing of different types of POI records. It is not necessary for all terminals to be able to use all records if the records of a database comprise such a field. When retrieving relevant POI records, the terminal type can be used as one criterion of retrieval by means of which fields that are unsuitable for or of no use to the terminal, are marked off from the set of results sought.

Figure 5B:
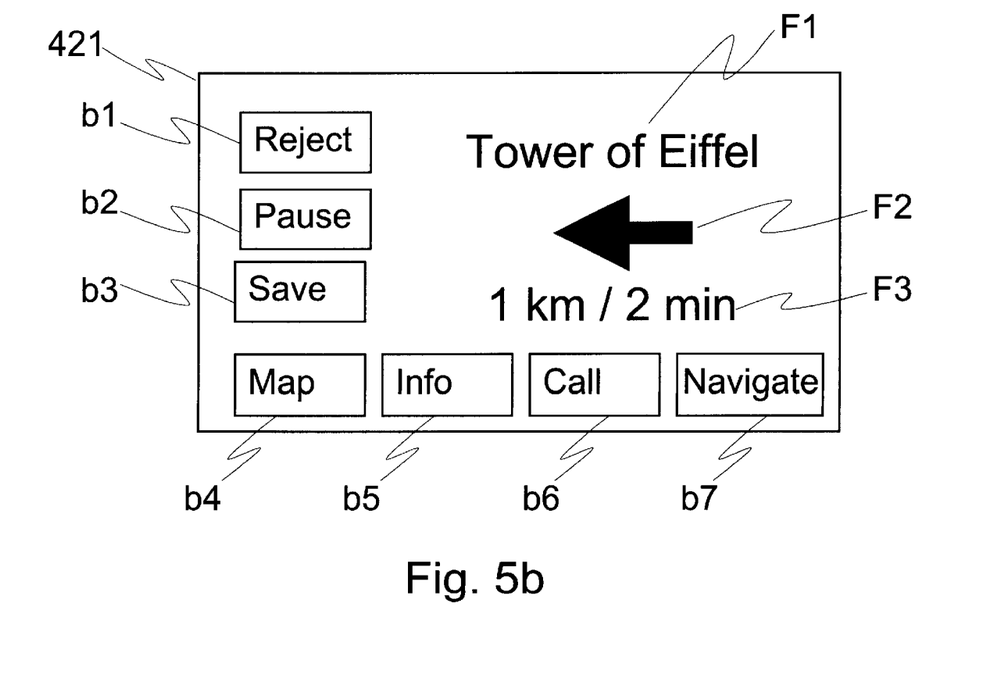
FIG. 5b shows a view on the display unit of a terminal according to the invention.

FIG. 5b shows the display unit 421 of a terminal according to the invention and the POI data presented by it to the user. The display unit is preferably a touch screen. In this case, it is possible to present on the display 'buttons' by pressing of which the terminal can be controlled. Alternatively, it is possible to use buttons placed on the sides of the display unit, the use of which can be indicated by means of a text to be presented on the display in their vicinity. The display in the figure shows one POI information the name of which is presented in a field F1 on top of the free area of the screen. Underneath the field F1, there is a field F2 wherein there is an indicator arrow roughly pointing towards the destination and, under this, still another field F3 wherein the distance and travel time calculated to the destination is given. The field F3 is particularly useful because it shows the user in a moment how far the POI is, and the user can immediately decide whether or not he is interested in the destination on that occasion.

The buttons presented on the display are Reject b1, Pause b2, Store b3, Map b4, Info b5, Call b6 and Navigate b7. A presented POI can be rejected with the button 'Reject' after which it will not be presented to the user. A rejected POI can either be just left unused until its criteria are met next time or it can be removed from the list of the user's points of interest, whereupon it will not be shown again to the user unless he reselects it on this list. With the button 'Pause', the user can keep the display on the display unchanged so that he can watch it later. Otherwise, POI data presented by the display unit 421 are preferably removed from the display after a specific delay and/or on the arrival of the next POI data. With the button 'Store', the user can store the presented POI data for later use in the terminal's memory or mass storage, if it is of rewritable type. From there, it can be reretrieved on to the display if the information no longer is on the display when it is needed later. With the button 'Map', the user can request for a map of the destination referred to by the POI data, which he can utilise when deciding whether or not he wants to go there and while he is navigating there. With the button 'Info', the user can request that more information be presented on the POI, preferably in a manner to be browsed. To facilitate the navigation, the user can also press the button 'Navigate', whereupon the terminal preferably informs when the user is approaching each crossing along the route, in which direction he should turn in order to get to the point of interest. Alternatively, the terminal can provide driving instructions comprising a map of the surrounding area, images of the most important crossings, information on the direction signs along the route, etc.

All records do not necessarily have the data essential for the use of all buttons, whereupon such buttons can be presented in a way indicating that they are not available for use.

Figure 6:
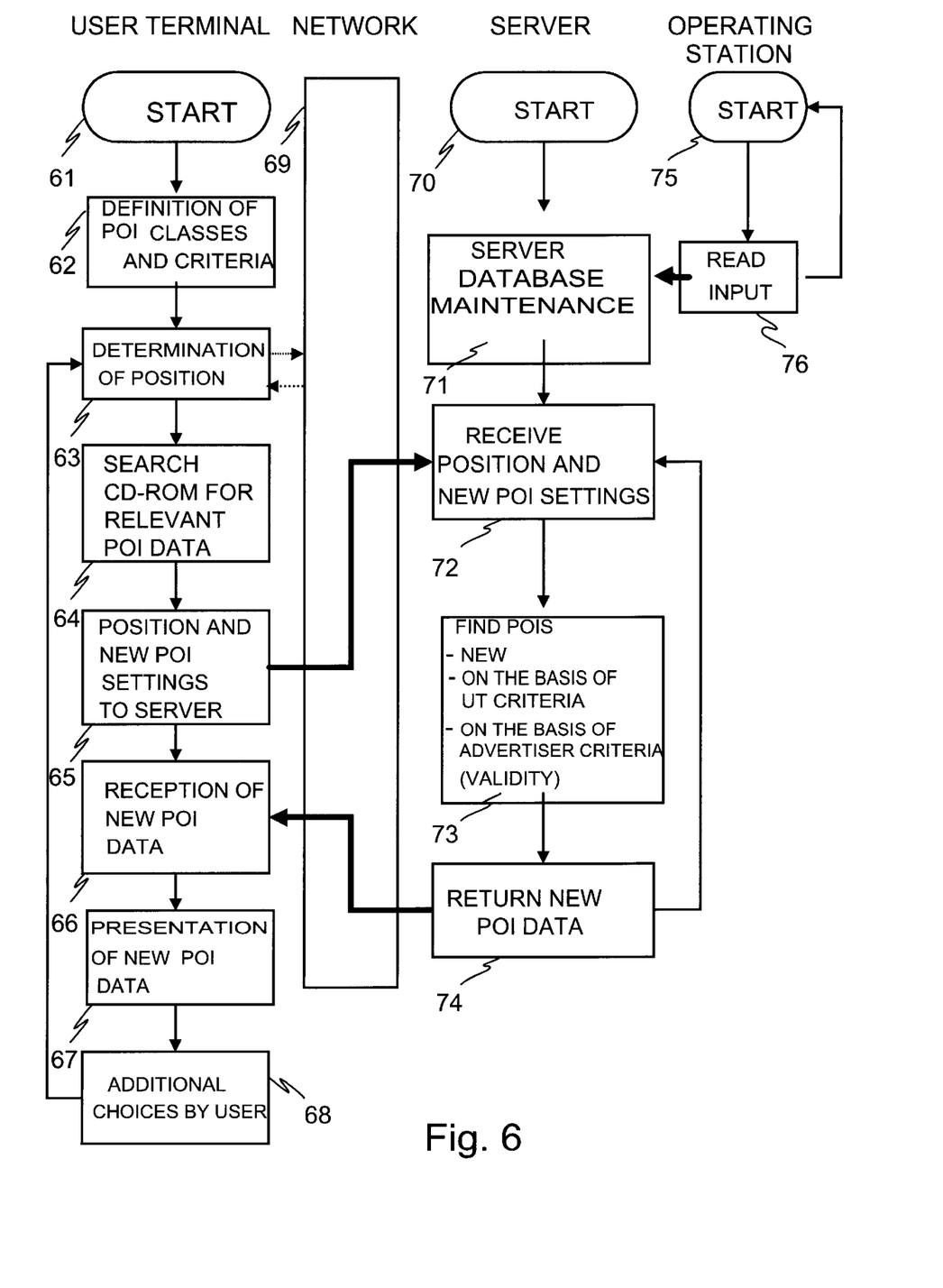
FIG. 6 shows schematically the operation of an information retrieval system according to a first aspect of the invention.

FIG. 6 is a flow diagram of the operation of an information retrieval system according to a first aspect of the invention. In a memory and/or mass storage of a user terminal, e.g. on a CD-ROM disk, there is a set of POI data and, in addition, the terminal receives into its read-alter storage new data that the CD-ROM lacks through a mobile communication network from a special POI server, into which POI data can be input from an operating station. In the system, the terminal controls the realisation of the criterion of notification of POI data and informs the user of the existence of such. The flow diagram has been divided into four columns in the vertical direction. From left to right, these columns describe the operation of the terminal, the mobile communication network, the POI server and the operating station.

Switching on the terminal leads to the initiation of the terminal in a block 61. After this, the user can define if he so desires, in a block 62, the POI data and/or the POI classes that are of interest to him, as well as the criteria on the meeting of which he will be informed of the available POI data. In a next block 63, the terminal determines its position, e.g. by means of a GPS device or acquires information on its position through a mobile communication network determined by, e.g. base stations of the mobile communication network. In a block 64, the terminal searches its own mass storage (CD-ROM) for such POI data as the user, in the block 62, has defined as being of interest to him or which belong to a class of POI data defined by the user as being of interest to him. When such POI data are found, the terminal will copy, in its scratch pad memory, the POI data found or at least a pointer to them. The terminal sends, in a block 65, its position and the possibly changed POI definitions through a mobile communication network 69 to the POI server. When performing the block 65 for the first time after the block 61, the terminal also preferably sends the information indicating the connection's first retrieval of POI data from the server. In a block 66, the terminal receives from the server new POI data if such are available. In the block 66, the identification, i.e. the index of each POI information found is preferably received first and the database fields that only relating to such POI data that the terminal does not yet have, are requested to be transmitted in their entirety. Thus, it is not necessary to transfer through the mobile communication network, such records in their entirety as the terminal has either in its own mass storage (CD-ROM) or it has already received from the server. Alternatively, the re-transfer of records can also be avoided if a second database is established for the server of the records transferred to each terminal. By avoiding additional data transfer, wasting the capacity of a data transfer network will be avoided.

A server can also preferably comprise a third database wherein it can store speed limits set on different roads and route maps in a digital form determined by means of junctions. In this case, the server can calculate the user's distance from each destination indicated by the POI data, as well as the estimated travel time to these POIs. The server can then only transfer to the terminal such POI data as are in the proximity determined by the user. In this case, a condition of proximity can be the distance between the terminal and the destination referred to by the POI data, the travel time calculated for travelling to the POI or their combination, wherein either or both are realised. By means of the mobile communication network enabled determination of position the server can also offer for the use of an ordinary mobile station a POI system, where the user's selections of interesting POI data or combinations of them, as well as the threshold separation or threshold separations of their notification either as distance or travel time are input into a server by means of a mobile station. The server can, e.g. send a message to this kind of mobile station or make a call to it and repeat the POI data, e.g. as a digitised recording or speech to be produced from text by speech synthesis although the determination of the position of a mobile station without a positioning device by means of base station bearings may lead to a more inaccurate determination of position.

After receiving a new relevant POI record or records, the terminal preferably informs of the arrived POI data with a short sound signal in a block 67. Alternatively, the terminal can present a message or the arrived POI data on its display unit or it can present them as speech. The received records are always relevant if the server has already selected them by calculating the separations of the POIs, referred to by them, from the terminal and, from the POI records 51 (FIG. 5), selected only those that meet the criteria set by the user. Otherwise, the terminal has to check each POI record to find whether or not it is relevant by calculating, on the basis of the co-ordinates of the informed destination and the co-ordinates determined by the terminal's positioning device, the distance or travel time between them. If several new POI data have arrived at the same time, the user is provided with an opportunity to select from them, e.g. by arranging the data into a list, each element of which is selected with a button closest to it, by pressing the display unit by the button or by identifying the selection the user has implemented by speaking by means of speech recognition devices. If this kind of list is longer than fits on the display in one lot, the user is preferably offered a possibility to browse the list by scrolling it on the display for searching for the POI data that are of interest to him. The user is also preferably offered additional selections in a block 68. The user may, e.g. pause the display, whereupon the presented POI data do not disappear from the display or he may remove the data, store them, ask the terminal to navigate to the destination informed by the POI, receive a map guiding to the destination referred to by the POI data, acquire additional data on the POI or make a call to the POI.

When the server has switched on, it will be initiated in a block 70. After this, the server's database can be maintained in a block 71. Maintenance can be implemented in a separate operating station or in the server itself, although the use of a separate operating station is more preferable. There can also be several separate operating stations and they can be connected to the server using different kinds of data transfer connections, whereupon they can also be located far from the server available to persons maintaining the POI database. When the server has been switched on, it will begin to perform a loop wherein it, in a block 72, receives from terminals their position data and also their new POI settings. The server can preferably have a fourth database for storing the POI setting of each terminal. In this case, the terminal does not always have to send to the server its POI setting so that the server could screen relevant records from its database in a block 73. The screening takes place on the basis of the criteria:

1. the record meets the criteria set in the terminal with respect to, e.g. the distance or calculated travel time or
2. the criterion of validity of the record is realised. If the server does not have this kind of fourth database, the terminal must send the server, in connection with each POI data inquiry, all the POI data selections and settings made in the terminal so that, in a block 74, the server could further screen a small set from the relevant records selected in the block 73 for being transferred through the mobile communication network to the terminal block 66. It is also possible to utilise said fourth database so that the terminal keeps in its memory the records it has received and the server itself compiles a list of the records transferred to each terminal and adds thereto indexes of new records in proportion as these are transferred to the terminal, and then empties the list when the terminal again next time informs of its first retrieval after its memory emptied or was emptied, e.g. after a power failure. In this case, the earlier mentioned second database is unnecessary. When the memory of the terminal becomes full, it preferably removes from its memory part of the records, preferably starting from the records which the user has not selected for being separately presented or saved. The first in—first out procedure can also be used for memory management or the records to be removed can be selected on the basis of the distance between the destinations, informed therein, and the terminal and, when the terminal is in a moving vehicle, also on the basis of the direction of movement. For example, such POI data can be less interesting the POIs of which the user has already passed.

The screening of new records that takes place in the block 74 comprises the searching for such records in the POI database that also fulfil the condition:

3. the record has not yet been transferred to the terminal (only if the server has said second database and it also comprises the indexes of the records transferred into the memory of each terminal);

Thus, screening according to the condition 3. can be implemented either by the server in the block 74 or by the terminal in the block 66.

After the block 74, the server again proceeds to perform the block 72. To allow several users use the system at the same time, the server is preferably arranged to be capable of several simultaneous processes extending from the block 72 to the block 74 or then it has to implement the blocks 72–72 rapidly by using, e.g. parallel processing. The maintenance of the POI database in the server, in the block 71, is also preferably arranged so that maintenance can be implemented at the same time while it is used for serving terminals. The server is preferably implemented using an operating system and software capable of true multitasking.

After being switched on, the operating station intended for maintaining a POI database carries out initiation 75. It then reads as user input, in a block 76, new POI data which become new POI records, and they are stored in the server's database.

The system has to search and inform the user of the terminal quickly enough when he has arrived in the vicinity of a POI, so that the information would be of maximum benefit. The available time depends on the speed at which the terminal and its user are moving, as well as on the criterion of separation. This time should preferably be so little that when receiving the notification, the user has proceeded, e.g. a maximum of 20–30% of the time or distance indicated by the criterion of separation. The maximum permissible time used for searching also depends on the direction of movement of the user with respect to the POI. If the user's route only goes for a short separation into the area corresponding to the 10 minutes of travel time, he will not necessarily stay even for one minute at that separation, and a system that checks POI data, e.g. at two-minute intervals, does not always observe the vicinity of the POI. The terminal may also go into a shadow region of the mobile communication network just when it arrives in the vicinity of some POI data and after coming from the shadow region, it may already be outside the criterion of separation. To avoid this, the system can preferably also retrieve in the memory of the terminal POI data relating to an extended area surrounding the user, taking into consideration the update delay.

Figure 7:
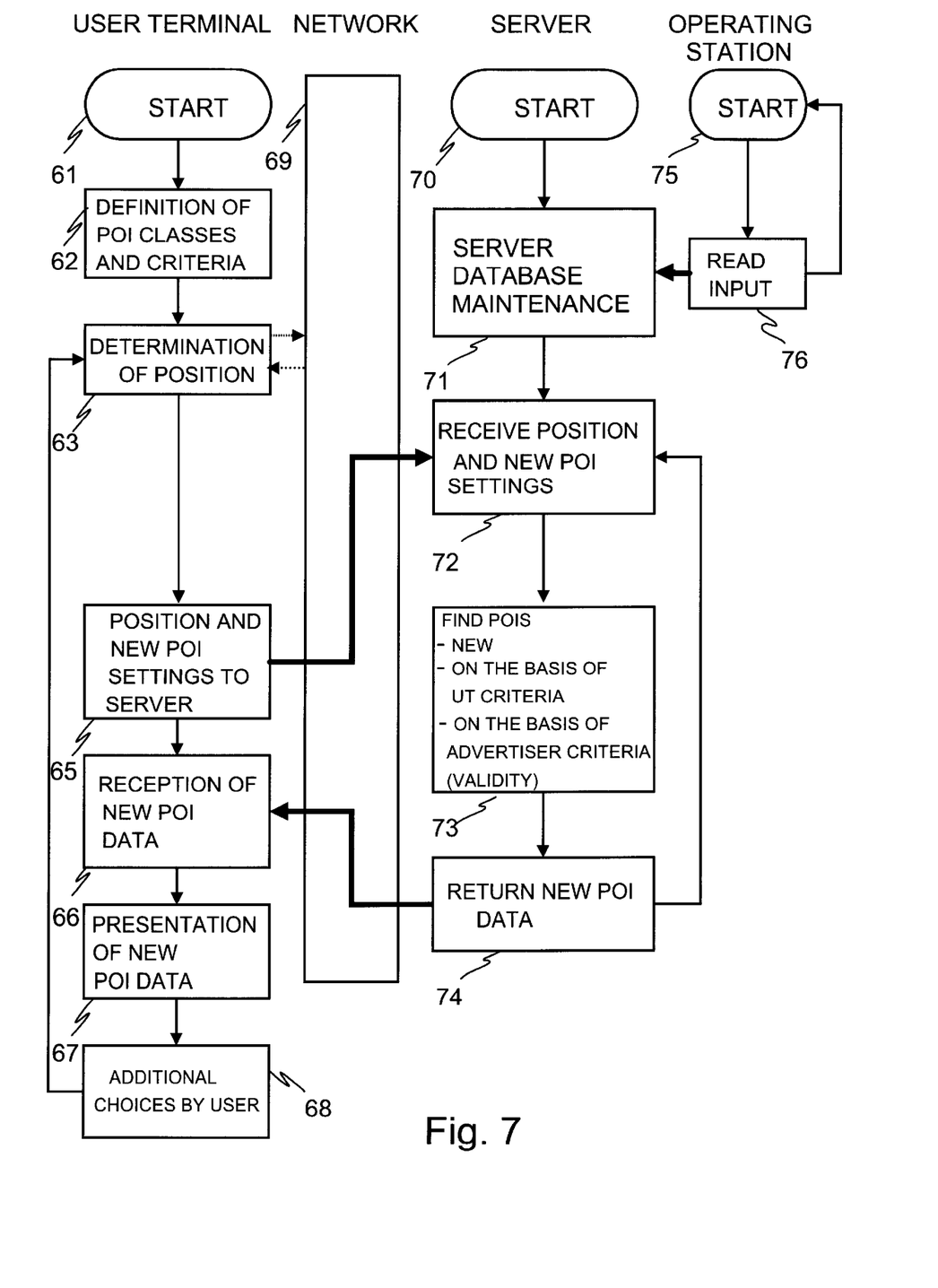
FIG. 7 shows schematically the operation of an information retrieval system according to a second aspect of the invention.

FIG. 7 shows schematically an information retrieval system according to a second aspect of the invention, which is partly the same as in FIG. 6. A terminal and a POI server are communicating through a mobile communication network. For example, a device according to FIG. 3, without the mass storage 310, can be used as the terminal, and a device according to FIG. 2, as the POI server. However, here a so-called dumb terminal is used, which does not select by itself POI data according to criteria but, instead, the POI server seeks them in its POI database. In order that the POI server could search for relevant POI data according to the selections made by the user with his terminal, the terminal also sends in this form POI settings to the POI server in the block 65, which preferably stores them in a second database found for users' POI settings. The terminal sends the server its positions at specific time intervals or after moving a specific distance, and the server searches them for relevant POI data, in the block 73, and on finding such, it sends them to the terminal in the block 74. After receiving new POI data, the terminal informs its user of such data and preferably presents a list of them or, alternatively, presents them in turn and keeps each of them on display on the display of the display unit for a specific period of time. The user can make additional choices in the block 68, for example, in the way shown in FIG. 5b, by means of which he can, e.g. remove or store information, request for a map of it or navigation assistance to a destination.

Figure 8:
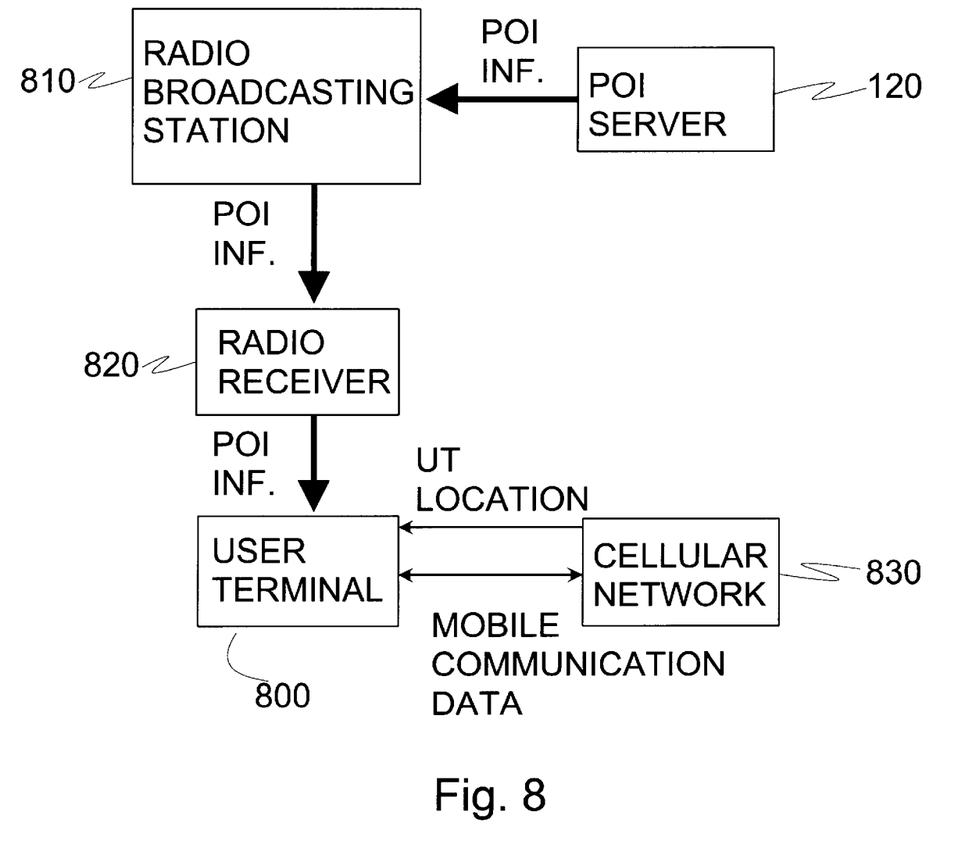
FIG. 8 is a block diagram of an information retrieval system according to a third aspect of the invention, showing the parts essential as regards the invention.
Figure 9:
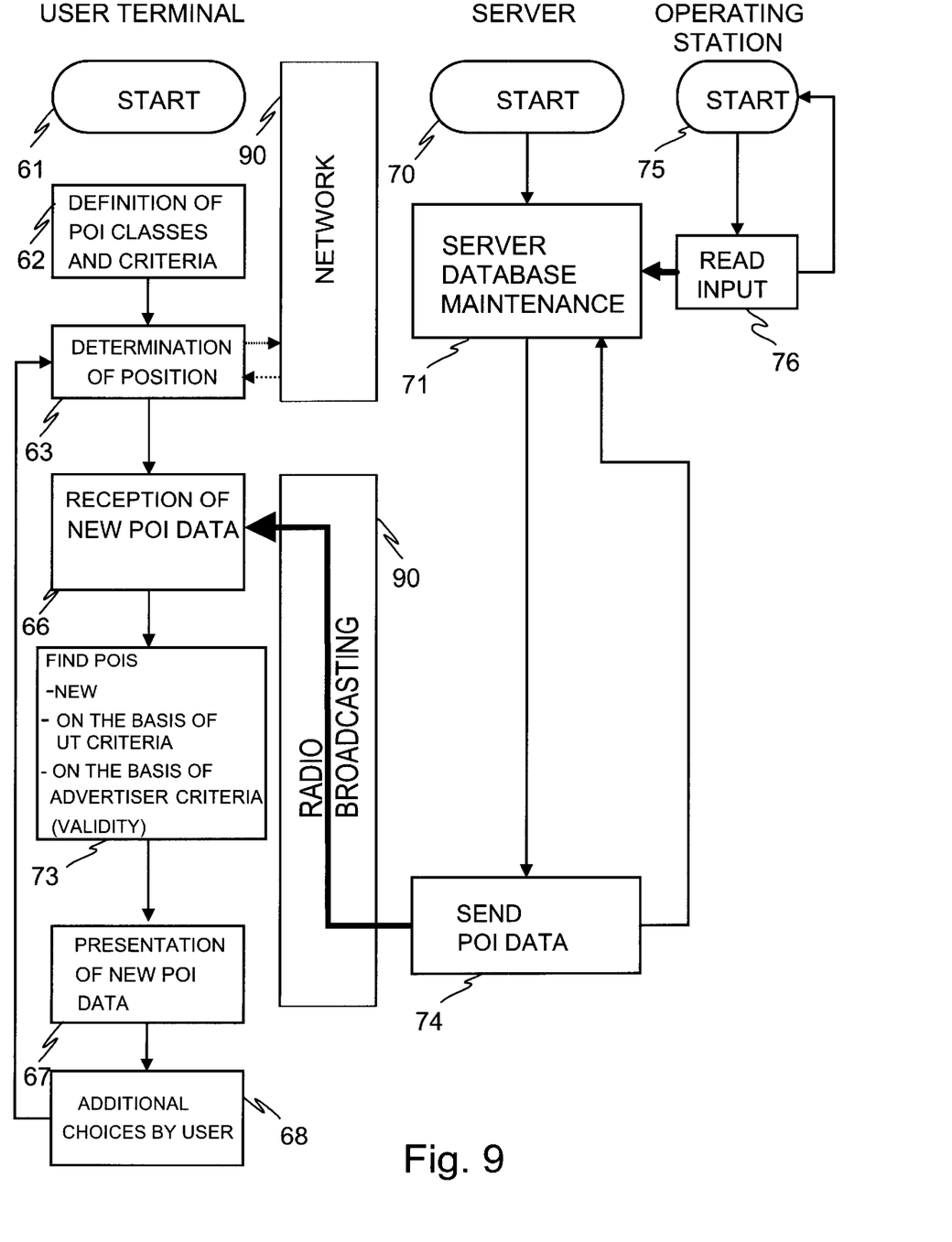
FIG. 9 shows schematically the operation of an information retrieval system according to a third aspect of the invention.

FIG. 8 shows an information retrieval system according to a third aspect of the invention. In the system, the POI server 120 delivers all the POI data within the coverage area of a transmitter 810 or a group of transmitters to a radio network for transmission of the data each in turn. A terminal 800 comprises a receiver 820 with which it receives POI data. The radio network used can be, for example, a digital radio network. Preferably, the terminal comprises a positioning device or it is connected to an external positioning device from which it gets its position. Alternatively, the terminal gets its position through a mobile communication network from an external positioning system, which position can be, e.g. an approximate position of a mobile communication device comprising the terminal determined by bearing by base stations of a mobile communication network 830. The terminal searches from the received data with its microprocessor for data according to the user's POI settings and the POI record's own criteria, and informs the user of them if they are found. The terminal can buffer in its memory, e.g. each POI record in its entirety or only the found records' names and index, by means of which it is possible to later receive and present to the user the entire content of the record according to his controls. Alternatively, the terminal does not know its position, but the POI server gets the position, e.g. from a mobile communication network, and sends the terminal correct POI data on the basis of FIG. 9 is a flow diagram of an information retrieval system according to a third aspect of the invention. The system is partly similar to the system in FIG. 6, but it completely lacks feedback from a terminal to a server. The user first determines, in his terminal, POI settings in the block 62, after which the terminal automatically repeats a loop wherein it positions itself in the block 63, receives POI data in the block 66, searches for relevant POI data in the block 73, when these are found informs the user of them in the block 67 and, allows the user to make additional choices if he so desires in the block 68. The server sends the POI data to the terminal as a radio transmission through a radio network 90, e.g. a digital radio.

The terminal can also comprise a mass storage for storing and using POI data. This can again be, e.g. a CD-ROM drive. In this case, the terminal preferably uses both POI data received on a radio path and POI data which are in the mass storage, and searches them for relevant data. Preferably yet, the system presents of the found POI data only one version of each destination, which can be, e.g. the freshest or the most covering, if there are different kinds of versions available of the same destination.

Figure 10:
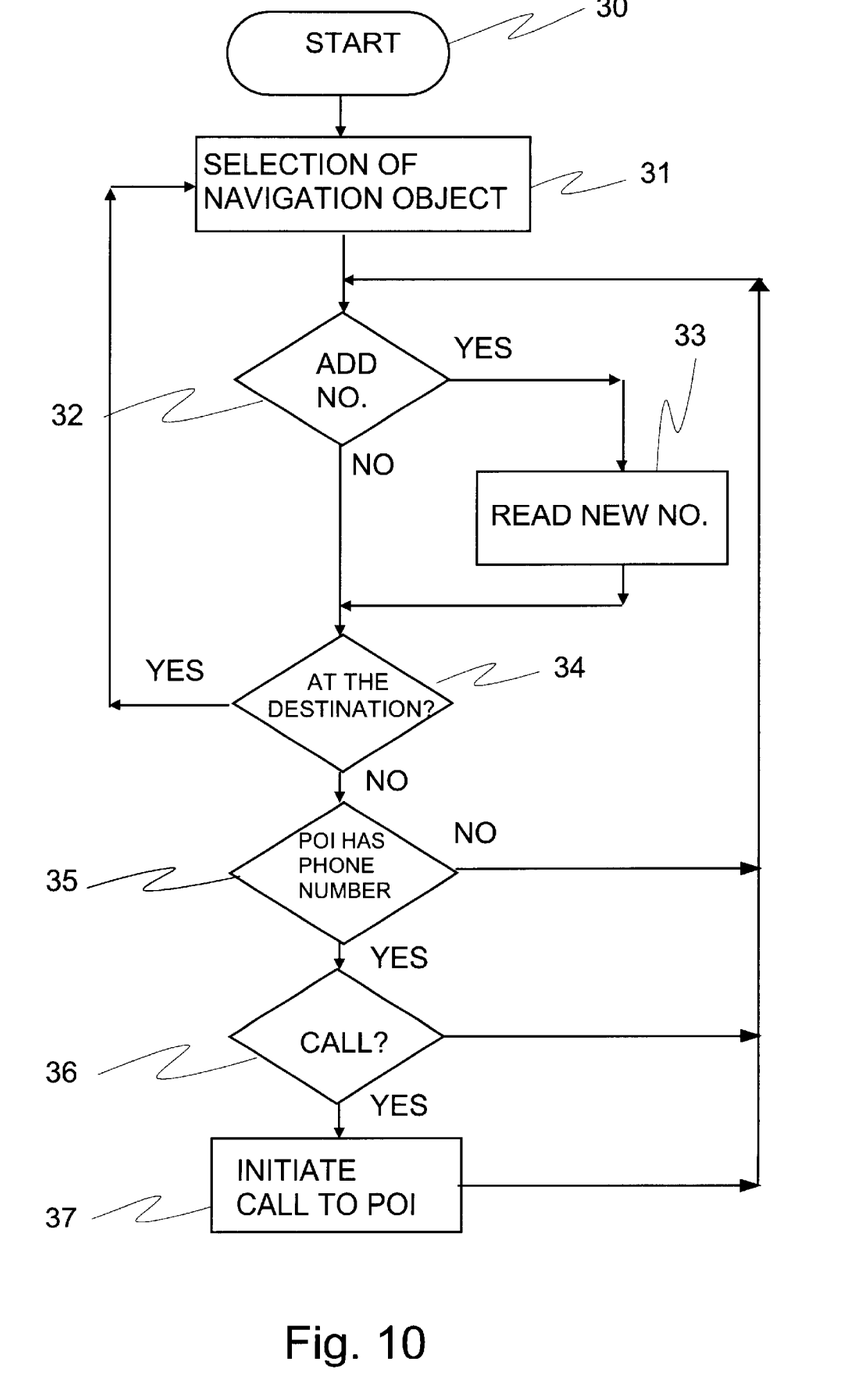
FIG. 10 is a flow diagram of making a call from a terminal, according to the invention, to a point of interest.

The flow diagram 10 shows the making of a call from a terminal, according to the invention, to a destination. The procedure begins from a block 30, i.e. start. The user selects, in a block 31, a POI or a navigation object, i.e. the place of destination where he is going. It will be checked, in a block 32, whether the user wants to add a new phone number to the place of destination. If this is the case, it will be read from the keyboard, in a block 33, and then continued from a block 34, otherwise, it will be proceeded directly to the block 34. In the block 34, the mobile station checks, by means of its positioning means 340, whether the place of destination has been reached. If this is the case, it will again ask for a new POI, in the block 31, otherwise it will check, in a block 35, whether it knows any phone number for the POI. If not, it preferably turns grey the legend b6 of the button 'Call POI' presented to the user on the display, whereupon the user can see at one glance that there is no phone number known for the POI. The phone number of the POI can be, e.g. linked between the records used in the information of POI data and the records of the mobile station's electronic phone book, as will be explained later by referring to FIG. 11. After the block 31, the procedure will return to the block 32 to check whether the user would like to input a phone number corresponding to the POI. If at least one phone number is known for the POI, the mobile station will indicate to its user that making a call to the POI is allowed by presenting, in a normal manner, the above-mentioned legend 'Call POI', and check, in the block 36, whether the user has used the switch reserved for making a call to a POI, in order to call it. If not, it will be returned to the block 32, otherwise, in a block 37, the mobile station will try to initiate a call to the phone number found for the POI or, if there are several numbers, it preferably allows the user to select the most suitable of them before it tries to initiate a call to the POI.

Because the user can add to the memory of his mobile station the phone number that the POI lacked, during the journey, it will preferably be returned to the block 32 later to check the existence of the number even if it had not existed before. In the block 32, it can also be checked whether there is a phone number for the POI, based on a position, available through a mobile communication network, preferably the kind the corresponding name of which is already in the phone book although without position data. Thus, when the user is navigating towards the Empire State Building, he can get the phone number of his acquaintance who is working there from among a number of other phone numbers in the same building if, when he does not have the number, the mobile station automatically sends once, e.g. by using a short message service (SMS), a directory inquiry request for all those numbers any number of the holder of which is in the phone book of the mobile station and the address of which is the same as the place of destination. The acquaintance in the example may well have a home number somewhere else, but the directory inquiry first finds, on the basis of the phone number, a full name and then, by means of the name and the address used as the POI, a second, desired phone number. If the POI is expressed in the mobile station as coordinates without a street address, the directory inquiry or an external server must first find the street address on the basis of the co-ordinates, e.g. by using a digital vector map drawn of the area.

Figure 11:
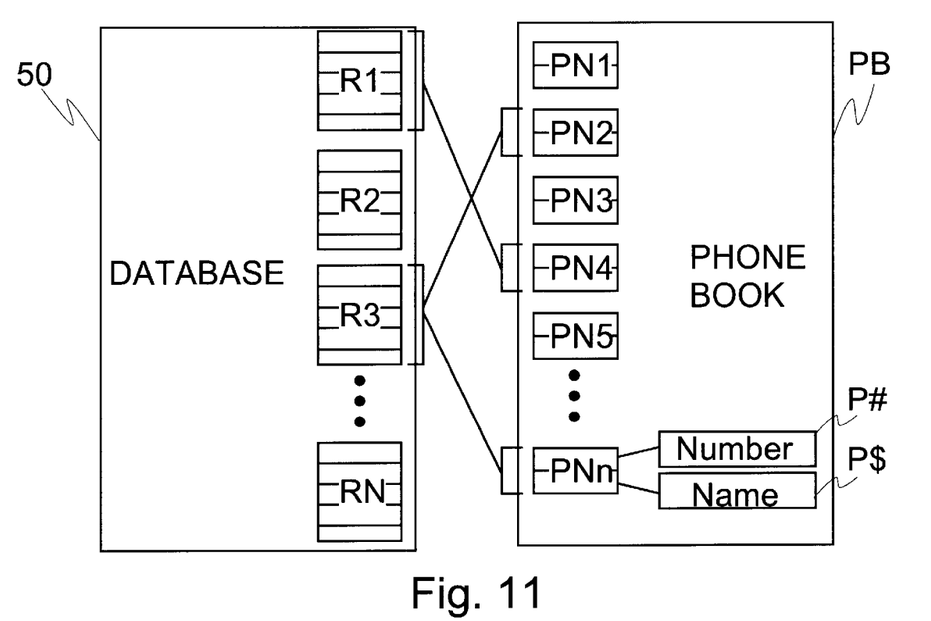
FIG. 11 is a block diagram of a linkage between a database comprising POI records in a memory of a terminal, according to the invention, and records of an electronic phone book of the terminal.

FIG. 11 shows an electronic phone book according to the invention and a linkage of POI records for allowing making call to a POI with a consistent "call" button b6. A terminal according to the invention comprises, in its memory, a phone book PB to be maintained by its user, wherein the user can store desired phone numbers P# and, alternatively, also names P$ corresponding to them. Thus, the electronic phone book is a small database, wherein there is a set of records PN1, PN2, PN3, PN4, PN5 . . . PNn. The linkage of the phone book and the POI records can be easily implemented by adding to the POI records stored in the terminal's memory yet another field, wherein the index of one phone book field or more corresponding to each POI record, i.e., in the most simple case, the number of the phone book memory location, e.g. FIG. 1 . . . 49, is stored. In the event that a POI data field POI data 533 of a point of interest also comprises a phone number, the linkage described above is not needed for making a call to the POI with the "call" button but, also in this case, a link to another number, input by the user himself, can preferably be stored for the POI.

Figure 12:
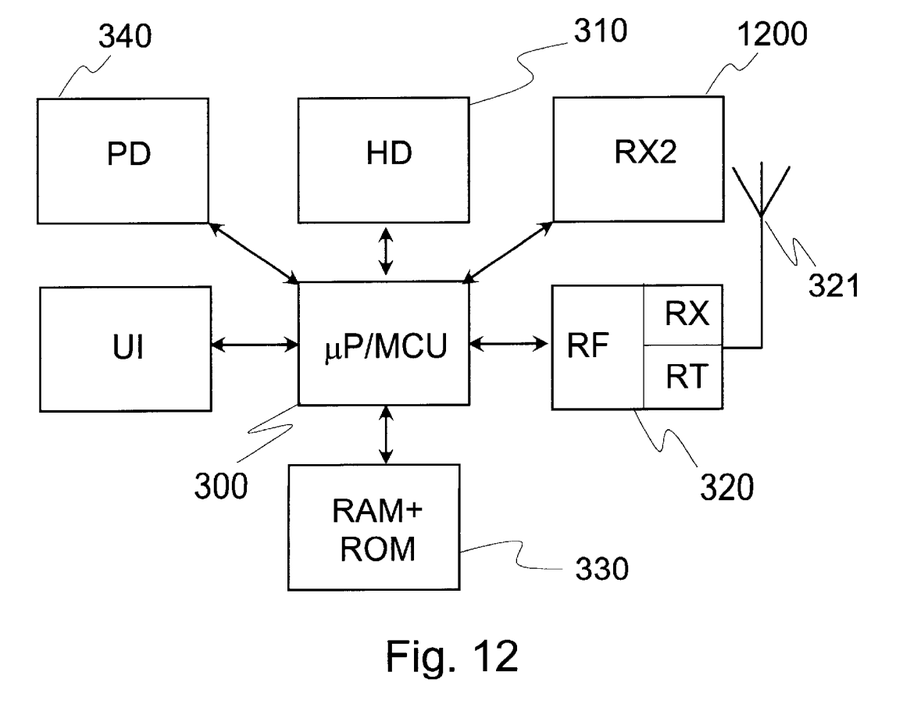
FIG. 12 is a block diagram of a terminal according to a third aspect of the invention, showing the parts essential as regards the invention.

FIG. 12 shows the parts of the structure of a terminal, according to a third aspect of the invention, essential as regards the invention. The figure corresponds otherwise to FIG. 3, but it also has a block 1200, a second radio receiver RX2. This can be, e.g. a radio receiver capable of broadcasting reception, which is also able to receive POI data transferred on a second radio channel as transmitted ancillary information.

A terminal according to the invention is preferably arranged to be able to receive POI data, input by the user, in its own POI database, the structure of which preferably corresponds to the above described POI server database 50. In addition, the invention can be further utilised by allowing the transmission of the user's own POI records to a second terminal, e.g. by means of a short message service SMS. For using the invention also in the simplest terminals, which do not necessarily have a display unit suitable for presenting graphics, for example, a service that operates on WWW pages can preferably be built by a microcomputer in order to produce a POI record in the terminal's own database. Especially, by using a map server allowing an automatic co-ordination representation of a POI selected from a graphic map representation, a new POI record can be easily established in the terminal's own database.

Such a record produced by a computer can be transferred to a terminal by sending it by means of a server which is in connection with a mobile communication network connected to the Internet, to the terminal using a radio path or, alternatively, by sending it using a data transmission port (infrared, serial port, parallel port) by using a Universal Serial Bus (USB) directly to the terminal or first to a portable mobile station and by transferring it from there further by means of any one of the above mentioned ways to a fixed terminal installed in a vehicle. As yet another alternative for a device used in data transfer at least between a portable mobile station and a vehicle terminal, we can mention a detachable mass storage, such as Scandisk Multimedia Card MMC, suitable for a mobile station and a terminal.

A terminal according to the invention can also be used for, e.g. controlling a control device connected to a telephone network. As one example of such, a user could, on his way home, when coming into the area of a base station surrounding his home receive on to his screen his home as POI data. By using the button "call" b6, he could make a call to a device controlling the functions of his home and send control commands by means of tone-frequency codes set in advance, e.g. for opening the door of his garage, for switching on the lighting, for switching off the burglar alarm and for putting on the coffee maker. For implementing this, the user would not have to look for a specific button or the right number.

The object of the POI data can be situated in a place other than the area intended for initiating its presentation. This can be implemented, e.g. by adding to the data on the POI the actual position of the POI as additional information or by allowing, in a database, one or more additional position information on a POI for determining one or more indication areas of the POI deviating from the surroundings.

A system according to the invention preferably also comprises a direct marketing register by means of which each user can, if he so desires forbid direct marketing, sent to him as POI data, completely or on the basis of some criteria, such as time or the type (class) of the advertised product or service.

This paper presents the implementation and embodiments of the present invention with the help of examples. It is obvious to a person skilled in the art that the present invention is not restricted to details of the embodiments presented above, and that the invention can also be implemented in another form without deviating from the characteristics of the invention. The embodiments presented should be considered illustrative, but not restricting. Thus, the possibilities of implementing and using the invention are only restricted by the enclosed claims.

Consequently, the various options of implementing the invention as determined by the claims, including the equivalent implementations, also belong to the scope of the invention.

What is claimed is:

1. A method for informing a mobile person of geographical points of interest (POI) that are of interest to him with an information retrieval device, comprising:

allowing said person to determine with said information retrieval device at least one point of interest he desires and a threshold separation, the threshold separation being at least one of the following variables: distance and time, repeatedly monitoring the position of said information retrieval device, collecting available information on points of interest, selecting from the available information on points of interest, points of interest which said person has defined with said information retrieval device as his desired points of interest and which are within said threshold separation from the location of said information retrieval device, transmitting a first point of interest identification information to the information retrieval device to identify the selected points of interest to the information retrieval device;

checking in the information retrieval device based on the first point of interest identification information whether the information retrieval device has more data on the points of interest identified by the first information;

the information retrieval device requesting through a mobile communications network, data on those of the points of interest identified by the first information on which the information retrieval device does not yet have more data; and transmitting a second information including more data on the requested points of interest to said information retrieval device.

2. A method according claim 1, wherein points of interest are grouped according to their type into different kinds of classes and a mobile person can define, by means of these classes, one or more points of interest at a time.

3. A method according to claim 1, wherein the becoming available of the data on the points of interest that are of interest to a mobile user is informed and the first information is then kept for a specific period of time on display on the information retrieval device during which time, when he so requests, he will be presented additionally the second information on a point of interest.

4. A method according to claim 3, wherein at the request of a mobile person, the first information is stopped being kept on display.

5. A method according to claim 1, comprising:

presenting data comprising the first and second information on a point of interest with said information retrieval device, the data on said point of interest comprising a phone number, and allowing said person to initiate a call to said point of interest with means of the information retrieval device.

6. A method according to claim 1, wherein said first information comprises an identifier of a point of interest.

7. A method according to claim 1, wherein said second information comprises descriptive information on a point of interest.

8. A method for informing a mobile person of a geographical point of interest that is of interest to him with an information retrieval device, comprising:

allowing said person to define with said information retrieval device at least one point of interest he desires and a threshold separation, the threshold separation being at least one of the following variables: distance and time, repeatedly monitoring the position of said information retrieval device, collecting available first information on all those points of interest which said person has defined with said information retrieval device as his desired points of interest and which are within said threshold separation from the location of said information retrieval device, transmitting to said information retrieval device its position with a specific accuracy, searching with said information retrieval device said compiled data for those points of interest which are within said threshold separation from the position of said information retrieval device at the time in question, and providing the information retrieval device with at least the first information of such a point of interest;

checking in the information retrieval device based on a first point of interest identification information whether the information retrieval device has more data on the points of interest identified by the first information;

the information retrieval device requesting through a mobile communication network data on those of the points of interest identified by the first information on which the information retrieval device does not yet have more data; and allowing the person to select to receive the second information if the person desires more detailed data on the first information.

9. An information retrieval device comprising positioning means for maintaining position data on said information retrieval device, wherein said information retrieval device comprises:

input means for receiving the selection of at least one point of interest that is of interest to a user and at least one criterion of separation from the user of said information retrieval device, the criterion of separation being one of the following variables: distance and time, a radio receiver for receiving POI data comprising a first point of interest identification information to identify a point of interest (POI) that meets at least one specific criterion of separation, a memory for storing the received POI data, and output means for automatically presenting the first POI identification information on the point of interest that meets at least one specific criterion of separation and that is of interest of the user;

checking in the information retrieval device based on the first point of interest identification information whether the information retrieval device has more data on the points of interest identified by the first information;

the information retrieval device requesting through a mobile communication network data on those of the points of interest identified by the first information on which the information retrieval device does not yet have more data; and the receiver being configured to receive a second information including more data on the requested points of interest.

10. An information retrieval device according to claim 9, wherein said positioning means is a satellite positioning device.

11. An information retrieval device according to claim 9, wherein said positioning means are integrated with other means of the information retrieval device, and arranged to be receiving with said radio receiver said position data from a mobile communication network or to be determining the position of the information retrieval device with a specific accuracy on the basis of other data received from a mobile communication network.

12. An information retrieval device according to claim 9, wherein said input means are arranged to receive classifications corresponding to the types of the points of interest that are of interest to the user, and the information retrieval device comprises a radio transmitter for transmitting said classifications on to a mobile communication network for being used elsewhere in order to screen the POI data to be sent to said information retrieval device according to said classifications.

13. An information retrieval device according to claim 9, wherein the information retrieval device comprises a mass storage for storing said POI data.

14. An information retrieval device according to claim 9, wherein said input means are arranged to receive from the user classifications corresponding to the types of the points of interest that are of interest to the user and said information retrieval device comprises means for screening the POI data in said memory according to said classifications.

15. An information retrieval device according to claim 9, wherein said radio receiver is arranged to receive, in addition to said POI data, the position data of the POI, said information retrieval device comprises means for verifying the meeting of said criterion of separation, and said output means are arranged to indicate, on the meeting of said criterion of separation, the availability of new POI data to the user, and said memory is arranged to stop storing said POI data after a specific time limit from its reception.

16. An information retrieval device according to claim 9, wherein said information retrieval device comprises means for storing said POI data at the request of the user until the user otherwise requests separately, and means for ending said storing.

17. An information retrieval device according to claim 9, wherein the POI data comprises a phone number, said memory is arranged to store said phone number, and the information retrieval device comprises a radio transmitter and means for initiating a call to a point of interest, to be presented with output devices, using the phone number stored in the memory.

18. An information retrieval device according to claim 9, wherein said information retrieval device comprises means for indicating an additional information request given by the user, and means for controlling said output means to present to the user the second information as additional POI data in response to said indication of the additional information request.

19. A server comprising processing means, for the use of the server being arranged a first database comprising a set of records each having at least one field, and which server comprises data transfer means by means of which it is arranged to be connected to at least one base station of a mobile communication network for transferring at least one field of a record to at least one information retrieval device, wherein said records comprise POI data on points of interest (POI) having at least a first information, which POIs are specific geographical places, said data transfer means are arranged to receive the position of said information retrieval device, said processing means are arranged to screen from said database relevant records that meet specific criteria, said data transfer means are arranged to transmit at least one field corresponding to the first information of at least one of said relevant records to said information retrieval device, wherein the data transfer means are further adapted to:

receive a request through a mobile communication network for data on those of the points of interest identified by the first information on which the information retrieval device does not yet have more data in at least one further field, the request having been received after the information retrieval device has checked, based on a first point of interest identification information, whether the information retrieval device has more data on the points of interest identified by the first information;

transmit at least one further field corresponding to a second information in response to having received the request.

20. A server according to claim 19, wherein of said criteria, another is the class of a point of interest.

21. An information retrieval system comprising:

a mobile communication network, an information retrieval device to be connected thereto, and a server, as well as a first database comprising a set of records, which comprise POI data on points of interest (POI), the points of interest being specific geographical places, and each record having at least two fields and, of the fields, one being for first information comprising an identifier of the POI and the second being for second information comprising the position of said POI and additional data on the POI, positioning means for determining the position data of said information retrieval device, first data transfer means for sending the position data of said information retrieval device to said server, said server comprising:

screening means for screening from said database relevant records that meet specific criteria, said data transfer means are arranged to transmit at least one field of at least one of said relevant records to said information retrieval device, and said information retrieval device comprising:

a radio receiver for receiving POI data of at least one point of interest, a memory for storing the received POI data, as well as output means for automatically presenting the first POI identification information on the point of interest that meets at least one specific criterion of separation and that is of interest of the user;

checking in the information retrieval device based on the first point of interest identification information whether the information retrieval device has more data on the points of interest identified by the first information;

the information retrieval device requesting through a mobile communication network data on those of the points of interest identified by the first information on which the information retrieval device does not yet have more data; and the receiver being configured to receive a second information including more data on the requested points of interest.

* * * * *